United States Patent Office 3,519,566
Patented July 7, 1970

3,519,566
METHOD OF MAKING ELECTROPHOTOGRAPHIC DEVELOPER FOR ETCH RESIST IMAGE PATTERNS

Walter L. Garrett, Freeland, Mich., and Henderson C. Gillespie, Moorestown, N.J., assignors to The Dow Chemical Company, Midland, Mich., a corporation of Delaware No Drawing. Filed Nov. 7, 1966, Ser. No. 592,344
Int. Cl. G03g 9/04
U.S. Cl. 252—62.1 4 Claims

ABSTRACT OF THE DISCLOSURE

A liquid electrophotographic developer composition for forming a photoresist in the preparation of printing plates, masters and the like contains a cross-linking promoting catalyst, a silicone intermediate resin, and a carrier liquid of an aliphatic or aromatic hydrocarbon, the composition being characterized by an electrical conductivity of from about $0.5 \times 10^{-11}$ to about $1.0 \times 10^{-9}$ reciprocal ohm centimeters. The composition is useful in bringing about cross-linking of the binder resin already laid down in admixture with a photoconductive material such as zinc oxide as a coating on a suitable substrate such as a photoengraving metal plate. After cross-linking of the binder in the coating, the uncross-linked portions of the coating are washed or dissolved away to leave photoresist.

This invention relates to electrophotography and more particularly concerns a new and novel electrically conductive developer composition for use in preparing printing plates and masters, and a method of preparing said composition.

One method of electrophotographically preparing printing plates comprises, for example, first establishing a thin photoconductive coating on an etchable plate of photoengraving grade magnesium or zinc base metal. The photoconductive composition may comprise, for instance, a mixture of a photoconductive zinc oxide suspended as a fine dispersion of particles in a cross-linking, film forming, resinous insulating binder. Suitable resinous binders include, for example, silicone intermediate resins such as e.g., SR–82 silicone resin (General Electric Co.), and epoxy resins having epoxide equivalent weights of from 475 to 2000. The plate so-coated is then negatively electrostatically charged by corona discharge means and exposed to an illuminated image desired to be reproduced, either by contact or projection techniques, thereby to form a latent electrostatic image or pattern on the plate. The images to be reproduced commonly include design work, lines, letters, and photographs. In the case of photographs, the image must first be "screened" in order to break up the image into so-called halftone dots before the charged plate is exposed thereto.

The latent image is subjected to the action of a number of subsequent steps to "develop" it to convert it to a visible fixed image which is, e.g., resistant to an acid etching composition (called a "resist"), or to convert it to an image suitable, e.g., for use in lithographic printing masters. These subsequent steps may comprise, for example, contacting the electrostatic image with cross-linking promoting catalyst particles of aluminum octonoate in an inert hydrocarbon carrier liquid, e.g., Isopar G (hereinafter defined), said particles being positively charged. So-contacted, the plate is rinsed as free of catalyst particles as possible, dried, then exposed to an elevated temperature to promote cross-linking (or curing) of the resin binder to form the aforesaid photoresist in the image areas. The non-image areas, not having been deposited by catalyst, are then removed with a suitable solvent and scrubbing. Any chromate conversion coatings underlying the resist are removed such as by an acid wash. The plate now exhibiting a visible image is ready for etching, preferably by the powderless etching process disclosed and claimed in U.S. Letters Patent 2,828,194 or 3,152,083. The plate may also be powder-etched.

An object of the present invention is to provide a novel developer composition for use in electrophotographically preparing fixed images on a substrate.

Another object of the invention is to provide an effective and improved electroconductive liquid developer composition for use in developing electrophotographic plates.

Another object is to provide a time-stable, electrically conductive, liquid developer for use in developing latent electrostatic images.

A further object of the invention is to provide a time-stable conductive liquid developer for use in processing electrophotographic plates to produce etchant resist image patterns thereon, and a method of preparing said liquid developer.

A still further object of the invention is to provide a stable developer composition which is characterized as having an electrical conductivity in solution, a high flash point and low toxicity, a high capacity, and which will not congeal upon standing for extended periods, the images developed being of high quality.

In general, the invention comprises a novel developer composition wherein the above objects and advantages have been found, comprising by addition, (a) a cross-linking promoting material such as a cross-linking catalyst, (b) a silicone intermediate resin, (c) a carrier liquid of an aliphatic or aromatic hydrocarbon, including compatible mixtures thereof, and (d) as an optional additional component, an insoluble solid pigment material, the mixture being characterized by an electrical conductivity within the range of from about $0.5 \times 10^{-11}$ to about $10^{-9}$ reciprocal ohm centimeters.

Developer compositions heretofore disclosed and employed were electrically insulating in purpose and selected for their deliberately low electrical conductivity. The carrier liquids in these conventional compositions are of high electrical resistivity as disclosed, e.g., in Reproduction Methods, October 1964, page 44 wherein it is stated that "The liquid phase is invariably an organic compound of high electrical resistivity . . . a minimum of about $10^{+9}$ ohm-cms. in value."

CROSS-LINKING PROMOTING MATERIAL COMPONENT

The cross-linking promoting material or catalyst component of the developer composition of the present invention is employed in an amount within the operable range of from about 35 to about 50 percent by weight, based on the total weight of all solid components added, and preferably from about 40 to about 45 percent. Examples of suitable catalyst materials are those which promote or aid cross-linking of resins used in electrophotographic coatings, such as, for example, silicone or epoxy resins, or mixtures thereof, as binders in the aforesaid photoconductive coatings. Such examples include alkoxy aluminum fatty acid salts and hydroxy ether aluminum fatty acid salts.

The alkoxy catalyst salts comprise in general a group of dialkoxy aluminum fatty acid salts wherein each alkoxy group of any particular salt within said group contains from 1 to about 10 carbon atoms, inclusive, and the fatty acid radicals thereof contain from about 6 to about 18 carbon atoms, inclusive. Of these alkoxy salts, dimethoxy aluminum octanoate and diethoxy aluminum octanoate are preferred. In general, these alkoxy aluminum fatty acid salts may be prepared by reacting a primary alcohol with an aluminum fatty acid salt under alkaline conditions, said alcohol having from 1 to about 10 carbon atoms, inclusive, and the fatty acid radical of said aluminum salt having from about 6 to 18 carbon atoms, inclusive, at a temperature of from about 20° to about 250° C., and separating the solid alkoxy aluminum fatty acid salt so-formed from the liquid phase of the reaction mass.

The hydroxy ether catalyst salts comprise in general a group of said salts corresponding to the formula:

$$\mathrm{Al}(\mathrm{OH})(\mathrm{R'})\text{—O—}(\mathrm{C}_n\mathrm{H}_{2n}\mathrm{O}\text{—})_m\mathrm{R}$$

wherein R′ represents a fatty acid radical containing from 6 to 12, inclusive, carbon atoms, *n* represents an integer of from 2 to 3, inclusive, *m* represents an integer of from 1 to 3, inclusive, and R represents an alkyl radical containing from 1 to 4 carbon atoms, inclusive. Of these hydroxy ether salts aluminum ethoxyethyl ether octanoate and aluminum ethoxy methyl ether octanoate are preferred. In general, these hydroxy ether salts may be prepared by reacting a primary straight chained glycol ether with an aluminum fatty acid salt under alkaline conditions, the fatty acid radical of said aluminum fatty acid salt having from 6 to 12 carbon atoms, inclusive, at a temperature within the range of from about 20° C. to about 250° C. for at least 15 minutes, and then separating the solid hydroxy ether aluminum fatty acid salt formed from the liquid phase of the reaction mass.

RESIN COMPONENT

The silicone intermediate resin component of the present inventive developer composition may be of both straight chained in structure, such as, for example, SR–82 silicone resin made by the General Electric Company or cyclic in structure, such as, for example, Z6018 made by the Dow Corning Corporation, provided the selected resin contains one or more reactive hydroxyl groups. SR–82 silicone resin, as indicated in the General Electric Co. product bulletin "Silicones Product Data," Revision A, superseding the issue of Aug. 15, 1955, is further characterized (1) as a hard silicone resin suggested primarily as a blending resin compatible with many organic resins, and (2) as a silicone polymer with OH groups thereon for polymerizing further. The resin is supplied as a straw colored xylol solution with about 60% solids content, a specific gravity of about 1.06 at 25° C., a viscosity in the range of 5 to 30 centipoises at 25° C., and with no catalyst present. Z–6018 intermediate, according to the Dow Corning bulletin 03–013, dated September 1964, and entitled "Information About Silicone Protective Coating Resins," is a hydroxy-functional (5.5% condensible hydroxyl content), low molecular weight (avg. 1600), silicone intermediate which will react with a wide variety of organic protective coating resins and monomers. The intermediate has a refractive index of 1.531 to 1.539. A xylene solution containing 60% by weight of this intermediate is clear, has a specific gravity of 1.075 at 77° F., and exhibits a viscosity of 33 centipoises at 77° F. The resin is employed in an amount by addition within the operable range of from about 1 to about 20 weight percent, and preferably in an amount of from about 10 to about 15 percent, based on the weight of total solids added in the developer composition. In a dilute developer bath composition for developing electrophotographic plates, the resin will be present in an amount of from about 0.05 to about 1.2 grams per liter of bath.

The resin component in contact with the catalyst component provides the necessary electrical conductivity characteristics to the developer composition as will hereinafter be described in connection with the method of preparing the composition in accordance with the present invention.

CARRIER LIQUID COMPONENT

This component of the bath comprises an aliphatic or aromatic hydrocarbon liquid, including compatible mixtures thereof. Suitable carrier liquids include, for example, pure isoparaffinic hydrocarbons, fluorinated hydrocarbons, aliphatic naphtha solvents, and particular odorless mineral spirits.

Operable total amounts by volume of the hydrocarbon carrier liquid or liquids to use per gram of the total combined weight of the solid components, that is, the catalyst, resin, and pigment, in order to make a developer mix, concentrate, or developer bath, depends upon the diluteness required or desired of the catalyst material in the composition during preparation or use of the present composition. The ratio of carrier liquid-to-solid components in the present novel composition employed in or during (1) preparation of the composition mix, (2) dilution of the prepared mix to a so-called concentrate, and (3) further dilution of the concentrate to form the developer bath will be discussed in detail hereinafter in the discussion concerning preparation of the present composition.

Suitable isoparaffinic hydrocarbon liquids which may be used as the carrier liquid component of the present developer composition include, for example, "Isopar G" (preferred) "Isopar E" and "Isopar H" (trademark of the Humble Oil & Refining Co.). These so-called "Isopars" are characterized by the following properties:

| Property | G | E | H |
|---|---|---|---|
| Kauri-butanol value | 27 | 29 | 27 |
| Flash point, TCC ° F | 104% | About 45 | 123 |
| Vapor pressure at 100° F | 0.4 | 1.0 | 0.4 |
| Evaporation rate at 100% concentrate (sec.) | 3,180 | 353 | 6,120 |
| Boiling range, ° F | 318–350 | 240–286 | 350–371 |

The isoparaffinic hydrocarbons are further characterized by exceptionally high purity levels, and relatively high flash points, either alone or in combination with the other components of the present composition, and thus are very well suited for use in the present invention. Of the "Isopars" mentioned, Isopar G is preferred for use herein.

The fluorinated hydrocarbon liquid which may be used as a carrier liquid herein is a stable fluorinated hydrocarbon corresponding to the formula $CCl_2FCClF_2$ called "Freon TF" (trademark of the E. I. du Pont de Nemours and Co.). Freon TF is a nonflammable liquid having a molecular weight of 187.39, a boiling point of 117.63° F., an evaporation rate of 170 seconds (based on $CCl_4$ being 100), a Kauri-butanol value of 31, and is characterized by a very low toxicity level. This fluorinated hydrocarbon gives very excellent results when used as a carrier liquid in the present developer.

Aliphatic naphtha solvents known as "Solvesso" (trademark of the Humble Oil & Refining Co.) 140 and Solvesso 150 are also useful as a carrier liquid in the composition of the present invention. These liquids are characterized by the following properties:

| Property | 140 | 150 |
|---|---|---|
| Kauri-butanol value | 30 | 87–90 |
| Flash point, ° F | 147 | 150 |
| Evaporation rate in seconds at 100% concentrate | 3,480 | 6,000 |
| Boiling range, ° F | 364–402 | 363–415 |

The high flash point and low toxicity properties of these aliphatic naphtha solvents provides a good carrier liquid for use in the invention.

Various odorless mineral spirits (aliphatic naphtha hydrocarbons) may also be employed as the carrier liquid of the novel developer composition of the invention. Those which are acceptable for use include odorless mineral spirits having a boiling range of from approx.

340° F. to about 415° F., a flash point of about 110° F. to about 160° F., and a Kauri-butanol value of from about 21 to about 35.

A particularly preferred species of odorless mineral spirits is one characterized by a boiling point of about 133° F., a flash point of about 133° F., and a Kauri-butanol value of about 25.

The amount of water in the developer liquid, regardless whether in the preparation of the mix or use thereof after dilution as a developer bath, as will hereinafter be discussed, should be as minimal as possible. In any event the developer liquid should be essentially anhydrous. Further, it should be understood that various impurities may be present in the developer composition, such as, for example, those impurity amounts present in the commercially available materials and especially the liquids.

PIGMENT COMPONENT

With respect to the insoluble solid pigment as an optional additional nonessential component of the present novel composition, an amount within the range of from about 30 to about 50 weight percent of the total weight of the solid components added is employed, and preferably, from about 35 to about 40 weight percent. Suitable pigment materials are those whose properties are compatible to those of the catalyst component. Pigments which may be used include, for example, black and red iron oxides, lead phthalocyananine, ultramarine blue, and cyan peacock blue, which is preferred. These pigments during the developing sequence deposit on and are attracted to essentially the same plate areas as the catalyst. They aid in actual development of the image areas, and primarily in rendering same visible.

PREPARATION OF DEVELOPER COMPOSITION

The novel developer composition of the present invention may preferably be prepared by independently preparing a so-called concentrate A and a concentrate B, then when a developer bath for use is desired, adding said concentrate A to concentrate B and diluting the mixture with additional carrier liquid to the desired level of catalyst per liter of bath and level of electrical conductivity. Both A and B concentrates have a suitable shelf life up to several weeks, e.g., up to 16 weeks or more. Another method of preparing the novel developer composition is to independently prepare concentrates A and B and subsequently add these together to form a mixture or concentrate C, which also has a suitable but lesser shelf life than concentrates A or B, then when a developer bath is desired for use, diluting the requisite amount of said concentrate C with additional carrier liquid to obtain the desired bath characteristics as aforesaid. Operably, the level of catalyst in the dilute bath for developing the aforedescribed electrophotographic plates ranges from about 0.005 to about 1.0 gram of catalyst per liter of bath, preferably about 0.1 to 0.25 gram. This range, however, is only indicative and not intended to be limiting since the operable level of catalyst will vary depending on the system and electrophotographic surface being developed.

So-called concentrate A is prepared by admixing the catalyst and resin components in a proportion of from about 0.5 to about 2.0 grams of catalyst per gram of resin in e.g., 25 ml. of carrier liquid, heating the mixture at a temperature of from about 50° C. to about 100° C. for a relatively inverse period of from about 40 to about 8 hours. In general, the admixture is heated under these conditions until a point is reached where the electrical conductivity of the mixture is relatively constant, as may be determined by a simple electrical measurement, such as by placing a 5 ml. portion of the mixture in 100 mls. of Isopar G and passing a current therethrough. This prepared mixture as concentrate A may be employed hot or as cooled, and may be stored as indicated hereinbefore.

Concentrate B is prepared by milling together, e.g., in a ball mill, for from about 8 to 72 hours, preferably 24–48 hours (or maximum of ½ hour in a sand mill) a slurry comprising a cross-linking promoting catalyst and optionally the pigment component (if a pigment is employed) in a proportion of, e.g., 3 grams of catalyst to 1½ to 10 grams of pigment together with sufficient carrier liquid such as Isopar G to make a creamy consistency suitable for ball milling. A typical formulation comprises 30 grams of catalyst, 30 grams of pigment and 700 ml. of Isopar G. This mixture is then intermediately diluted with additional carrier liquid, e.g., 3000 ml., to form a concentrate B. It is preferred to employ cyan peacock blue as the pigment.

Formulation of a developer bath from these concentrates comprises adding A and B together in predetermined proportions to obtain a bath having (1) the prescribed electrical conductivity level (supplied primarily by additions of concentrate A) and (2) the prescribed level or concentrations of catalyst (supplied primarily by additions of concentrate B).

As aforesaid, concentrates A and B may be admixed in predetermined proportions with additional carrier liquid to form an intermediate concentrate C such that when further diluted to formulate an electrophotographic developer bath, the bath will provide an electrical conductivity and catalyst concentration within the limits hereinbefore defined.

Generally, in ball milling ingredients in the preparation of the present developer compositon, a ceramic jar of suitable capacity is employed using steel or ceramic balls or pellets as grinding media at approximately 100 revolutions per minute. A suitable grinding viscosity lies within a viscosity range of from 2500 to about 11,000 centistokes, preferably from about 5000 to 6000 centistokes.

The ratio of solids-to-carrier liquid for purposes of grinding in general is in the order of from about 6 to 9 grams of solids (pigment, resin, and catalyst) to about 90 cubic centimeters of carrier liquid, with about 7.5 grams of solids to 90 cc. of carrier liquid.

USE OF DEVELOPER COMPOSITION

When employing the present composition as a bath to develop electrographic plates, the concentrate of the composition, as hereinbefore described, is first diluted with additional carrier liquid, preferably of an aliphatic type, to provide the proper concentration by weight of catalyst per liter of final bath and the desired level of electrical conductivity. The bath so-formulated is then placed in a developer tank, which may be a tray or preferably a commercially available developer tank which circulates the bath. The plate to be developed is immersed in the tank. The duration of the plate in the developer is a matter of seconds, e.g., from about 15 to 45 seconds. From time-to-time, of course, the bath must be replenished as needed with more catalyst.

Among the advantages of the invention are that the developer composition has a high capacity for processing electrophotographic plates, an accelerated and complete image development, controlled deposition of catalyst particles in image areas in a manner to prevent excess and waste of catalyst, and effective control of unwanted deposition of catalyst particles in the non-image areas. In addition, the developer concentrate and bath are time-stable and do not congeal upon prolonged standing. The developer of the present invention, moreover, is essentially non-corrosive, substantially non-hazardous, and has a low tolerable toxicity level.

The following example is only illustrative of the invention and is not to be construed as limiting it thereto.

EXAMPLE

About 2 grams of Dow Corning Z6018 silicone intermediate resin and 1 gram of dimethoxy aluminum octanoate was dissolved in 25 ml. of xylene and the solution heated for 4 hours at 70° C. to prepare a concentrate A. About 3 grams of dimethoxy aluminum octanoate was then ground in a ball mill with 3 grams of cyan peacock blue pigment and sufficient Isopar G to obtain a suitable grinding viscosity thereby to prepare a concentrate B. The grinding was carried out at room temperature in a 150 ml. capacity ball mill using 60 one-quarter inch diameter steel balls at approximately 100 revolutions per minute for about 48 hours.

To make a working developer composition, from 1 to 5 drops of the above concentrate A was added to 100 ml. of Isopar G, whereupon, about 1.5 ml. of concentrate B was added thereto. This mixture had an electrical conductivity of from about $0.5 \times 10^{-11}$ to about $10^{-9}$ reciprocal ohm centimeters and was used to develop a number of small coupon sized plates which had previously been electrostatically charged in the dark and then exposed to an image by a focusing technique. The developed images were clear and sharp and of excellent quality, having been completely developed. Essentially there was no deposition of catalyst in the non-image areas and there appeared to be little or no excess deposition of catalyst in the image areas.

On prolonged standing for several days the developer liquid or composition did not congeal at all.

The developer concentrates A and B were stored for several months on a shelf, whereupon, a working developer bath was prepared therefrom similarly as aforesaid and used to develop charged, and exposed electrophotographic plates. Similarly as with the fresh bath, the bath prepared from the stored concentrates was of a conductivity within the range hereinbefore stated and a number of high quality test coupon plates weer obtained.

Measurements of electrical conductivity of the developer compositions herein were made using parallel electrodes 2.5 cm. x 4.0 cm. spaced 0.6 cm. apart. The electrodes were placed at a standard depth in 115 ml. of 1.5 o./o. solution of said developer in a 150 ml. beaker. 500 volts of currents were applied and the current was measured in micro-amperes. Isopar G was found to have a conductivity of $0.5 \times 10^{-13}$ reciprocal ohm-cms.

The invention may be changed and modified without departing from the spirit or scope thereof, and it is understood that the invention is only limited as defined in the appended claims.

We claim:

1. A method for preparing a developer bath with a conductivity of from about $0.5 \times 10^{-11}$ to about $10^{-9}$ reciprocal ohm centimeters for developing electrophotographic plates to produce etchant resist image patterns thereon which consists essentially of the combination of steps of: heating a cross-linking promoting catalyst for resins with a silicone intermediate resin containing one or more reactive hydroxyl groups at a temperature of from about 50° C. to about 100° C. for a period of time until the electrical conductivity of the mixture is relatively constant, the proportion of catalyst being about 0.5 to 2 grams per gram of resin, milling for from about 8 to about 72 hours a cross-linking promoting catalyst in sufficient carrier liquid to obtain maximum grinding effect, and admixing the milled catalyst and resin together with sufficient liquid carrier diluent to provide a liquid developer composition having said conductivity while also providing the promoting catalyst in the developer bath at a concentration of from 0.005 to about 1.0 gram per liter of liquid developer, the promoting catalyst being a material selected from the group consisting of an alkoxy aluminum fatty acid salt, a hydroxy ether aluminum fatty acid salt and mixtures of such salts, and said carrier liquid being an organic liquid selected from the group consisting of isoparaffinic hydrocarbon, fluorinated hydrocarbon, aliphatic naphtha solvent, and a mixture thereof, and having a Kauri-butanol value in the range of about 21 to 35.

2. The method of claim 1 wherein the catalyst is milled in the presence of a solid soluble pigment material having the same polarity as said catalyst.

3. The method of preparing a developer bath for developing electrophotographic plates to produce etchant resistant image patterns thereon and the bath having a conductivity of from about $0.5 \times 10^{-11}$ to about $1.0 \times 10^{-9}$ reciprocal ohm centimeters which consists essentially of the combination of steps of:

(a) heating a cross-linking promoting catalyst with a silicone intermediate resin containing one or more reactive hydroxyl groups in the presence of a carrier liquid selected from the group consisting of isoparaffinic hydrocarbon, fluorinated hydrocarbon, aliphatic naphtha solvent, and a mixture thereof, and having a Kauri-butanol value in the range of about 21 to 35, at a temperature of from about 50° C. to about 100° C. for a period of time until the electrical conductivity of the mixture becomes relatively constant, the proportion of catalyst in the so-formed mixture being in the range of about 0.5 to 2 grams per gram of resin, (b) ball milling for from about 8 to 72 hours a cross-linking promoting catalyst in sufficient carrier liquid of an aliphatic or aromatic hydrocarbon to provide a creamy slurry having maximum grinding effect, (c) diluting the ball milled mixture with additional carrier liquid, and (d) within several weeks prior to using the said developer bath, mixing the heated mixture with the ball milled and diluted mixture in predetermined proportions to obtain the said developer bath, the bath having the stated conductivity and containing from about 0.005 to about 1.0 gram of cross-linking catalyst per liter of bath, and the promoting catalyst being a material selected from the group consisting of an alkoxy aluminum fatty acid salt, a hydroxy ether aluminum fatty acid salt and mixtures of such salts.

4. The method as in claim 3 in which about 0.5 to 5.3 grams of pigment per gram of catalyst is combined with the catalyst in the ball milling step.

References Cited

UNITED STATES PATENTS

| | | | |
|---|---|---|---|
| 2,877,133 | 3/1959 | Mayer | 252—62.1 |
| 2,907,674 | 10/1959 | Metcalf et al. | 252—62.1 |
| 3,241,998 | 3/1966 | Oliphant | 252—62.1 |
| 3,291,738 | 12/1966 | Sciambi. | |

OTHER REFERENCES

Meals et al.: Silicone, Reinhold Publishing Corp., New York, pp. 114, 115 and 187 (1959).

J. D. WELSH, Primary Examiner

U.S. Cl. X.R.

117—37; 156—13; 260—33.6